US007848726B2

(12) United States Patent
Kato

(10) Patent No.: US 7,848,726 B2
(45) Date of Patent: Dec. 7, 2010

(54) HIGH-FREQUENCY RECEIVER AND ADJACENT INTERFERENCE WAVE REDUCING METHOD

(75) Inventor: Sei Kato, Kawagoe (JP)

(73) Assignee: Pioneer Corporation, Tokyo (JP)

( * ) Notice: Subject to any disclaimer, the term of this patent is extended or adjusted under 35 U.S.C. 154(b) by 663 days.

(21) Appl. No.: 11/886,261

(22) PCT Filed: Mar. 3, 2006

(86) PCT No.: PCT/JP2006/304158

§ 371 (c)(1),
(2), (4) Date: Nov. 13, 2007

(87) PCT Pub. No.: WO2006/098173

PCT Pub. Date: Sep. 21, 2006

(65) Prior Publication Data

US 2008/0171525 A1 Jul. 17, 2008

(30) Foreign Application Priority Data

Mar. 16, 2005 (JP) .............................. 2005-075509

(51) Int. Cl.
*H04B 1/00* (2006.01)
(52) U.S. Cl. ........................ 455/307; 455/266; 455/336
(58) Field of Classification Search ................. 455/307, 455/254, 266, 336, 334; 375/350
See application file for complete search history.

(56) References Cited

U.S. PATENT DOCUMENTS

| 5,357,574 | A | | 10/1994 | Whitecar | |
|---|---|---|---|---|---|
| 5,467,399 | A | | 11/1995 | Whitecar | |
| 5,955,783 | A | * | 9/1999 | Ben-Efraim et al. | 455/296 |
| 6,670,901 | B2 | * | 12/2003 | Brueske et al. | 455/307 |
| 6,937,670 | B2 | * | 8/2005 | Cowley et al. | 455/315 |
| 7,526,052 | B2 | * | 4/2009 | Davidoff et al. | 455/130 |
| 2007/0291883 | A1 | * | 12/2007 | Welz et al. | 455/307 |
| 2008/0226001 | A1 | * | 9/2008 | Geng et al. | 375/350 |
| 2009/0086864 | A1 | * | 4/2009 | Komninakis et al. | 455/296 |

FOREIGN PATENT DOCUMENTS

| JP | 8-504549 A | 5/1996 |
|---|---|---|
| JP | 2003-234617 A | 8/2003 |
| JP | 2003-347949 A | 12/2003 |
| JP | 2004-260528 A | 9/2004 |
| JP | 2004-260552 A | 9/2004 |
| WO | WO 94/14246 A1 | 6/1994 |

* cited by examiner

*Primary Examiner*—Lana N Le
(74) *Attorney, Agent, or Firm*—Foley & Lardner LLP

(57) ABSTRACT

A high-frequency receiver alleviates an influence of adjacent interference waves in a location where an identical set of broadcast channels can be received with different broadcast waves which are broadcast or relayed in frequency bands different from one another by satellites and ground repeater (s). The I and Q signals are passed to a pair of variable LPFs. A demodulation unit is provided for each of said different broadcast waves to demodulate the I and Q signals derived from the broadcast wave into a demodulated signal. One of the demodulated signals which has a better reception quality is selected for output. Based on a reception level and a noise evaluation information (e.g., the bit error rate) for a selected demodulated signal, a controller controls the bandwidths of the variable LPFs so as to optimize the reception level and the noise evaluation information for the selected demodulated signal.

16 Claims, 5 Drawing Sheets

FOR A CASE IN WHICH A GROUND WAVE IS RECEIVED
IN AREA WHERE THE GROUND WAVE IS BETTER RECEIVED

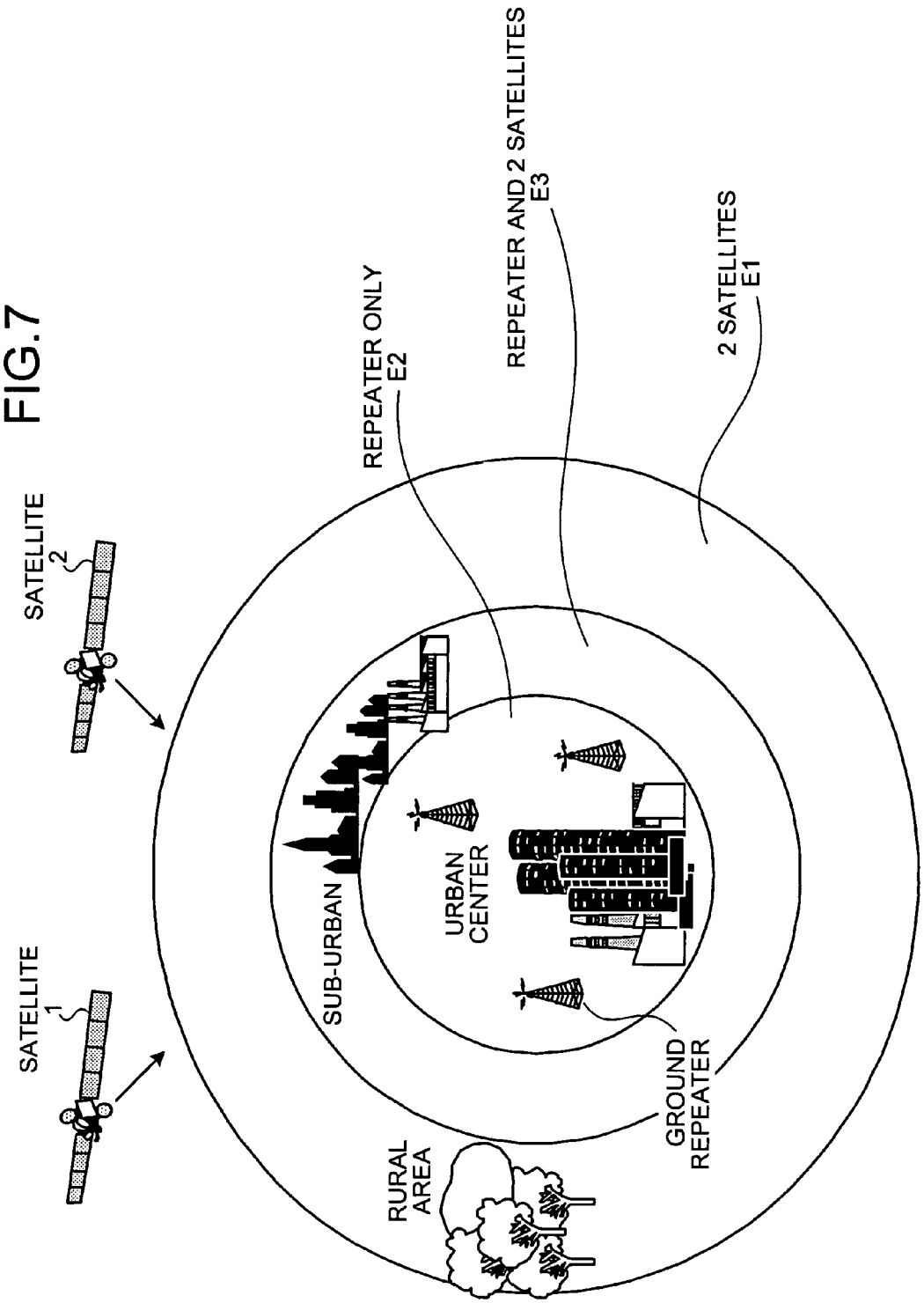

HIGH-FREQUENCY RECEIVER AND ADJACENT INTERFERENCE WAVE REDUCING METHOD

TECHNICAL FIELD

The present invention relates to a high-frequency receiver and a method of reducing adjacent interference waves. More particularly, the present invention relates to a high-frequency receiver capable of reducing adjacent interference waves and a method of reducing adjacent interference waves.

BACKGROUND ART

In North America, the XM satellite radio broadcast has been conducted since 2001. FIG. 5 is a diagram for explaining an XM satellite radio broadcast system. As shown in FIG. 5, in the XM satellite radio broadcast, the same contents are transmitted by satellite waves SAT1 and SAT2 from two satellites 1 and 2 and a ground wave TERR from a ground repeater. If a receiver can receive at least one of the waves, the receiver can reproduce sound without sound interruption. The satellite waves SAT1 and SAT2 are QPSK-modulated and the ground wave TERR is MCM-modulated.

FIG. 6 is a diagram of a frequency band of the XM satellite radio broadcast. The XM satellite radio broadcast uses a frequency band in a bandwidth of 12.5 MHz from 2332.5 MHz to 2345.0 MHz. The frequency band is divided into six slots including an A slot of the satellite wave SAT1, an A slot of the satellite wave SAT2, an A slot of the ground wave TERR, a B slot of the satellite wave SAT1, a B slot of the satellite wave SAT2, and a B slot of the ground wave TERR. In the A slots, for example, contents of 1 to 60 ch are transmitted. In the B slots, for example, contents of 61 to 120 ch are transmitted. The same contents are transmitted or broadcast in three bands.

FIG. 7 is a diagram for explaining a reception area of the XM satellite radio broadcast. For the sake of reception of the XM satellite radio broadcast, ground repeaters are provided for areas where it is difficult to receive radio waves from the satellites 1 or 2. For example, an area E1 in the suburbs where there is no obstacle such as a high building can receive a satellite wave, an area E2 such as an urban district where it is impossible to receive the satellite wave can receive a ground wave, and the middle of the area E1 and the area E2 can receive the satellite wave and the ground wave. This allows users to view the broadcast in any locations in North America.

When there are broadcast waves adjacent to a broadcast wave intended to be received, it is likely that the adjacent broadcast waves (hereinafter referred to as "adjacent interference waves" as well) interfere with the broadcast wave intended to be received and a reception failure is caused to deteriorate sensitivity of reception. A technique for setting a bandwidth of a pass band of a filter, which determines a reception signal band, in a narrow band to prevent this reception failure due to the adjacent interference waves is well known (see, for example, Patent Document 1).

Patent Document 1: Published Japanese Translation of a PCT patent application No. 8-504549

DISCLOSURE OF INVENTION

Problem to be Solved by the Invention

However, in the method of setting a bandwidth of a reception frequency to a narrow band, there is a problem in that reception performance such as a sound quality may be deteriorated because even a frequency necessary for faithfully reproducing a sound signal is removed.

The present invention has been devised in view of the above problem and it is an object of the present invention to provide a high-frequency receiver capable of reducing a reception failure due to adjacent interference waves and a method of reducing adjacent interference waves.

Means for Solving Problem

The above-mentioned problem is in large part solved by an aspect of the invention, which provides a high-frequency receiver for use in a location where an identical set of broadcast channels can be received with different broadcast waves which are broadcast or relayed in frequency bands different from one another. The high-frequency receiver comprises a separating unit that separates received broadcast channel signals into I signals and Q signals; a pair of variable LPFs which only pass frequency components of the I signals and Q signals which components are within respective bandwidths thereof, each variable LPF being configured to be capable of changing the bandwidth thereof in response to a control signal given externally; a demodulation unit, provided for each of the different broadcast waves, for demodulating the I and Q signals derived from the broadcast wave into a demodulated signal; a selector for selecting one of the demodulated signals which has a better reception quality; a reception-level detector that detects a reception level of each of the received broadcast waves; a noise evaluation information detector that detects noise evaluation information of each of the received broadcast waves; and a control unit, operative based on the reception level and the noise evaluation information for a selected demodulated signal selected by the selector, for supplying the pair of variable LPFs with the control signal which controls the bandwidths of the variable LPFs so as to optimize the reception level and the noise evaluation information for the selected demodulated signal.

Another aspect of the invention provides a method of alleviating an influence of adjacent interference waves in a high-frequency receiver used in a location where an identical set of broadcast channels can be received with different broadcast waves which are broadcast or relayed in frequency bands different from one another. The method comprises separating received broadcast channel signals into I signals and Q signals; passing the I signals and Q signals to a pair of variable LPFs which pass only frequency components of the I signals and Q signals which components are within respective bandwidths thereof, each variable LPF being configured to be capable of changing the bandwidth thereof in response to a control signal given externally; for each of the different broadcast waves, demodulating the I and Q signals derived from the broadcast wave into a demodulated signal; selecting one of the demodulated signals which has a better reception quality; detecting a reception level of each of the received broadcast waves; detecting noise evaluation information of each of the received broadcast waves; and based on the reception level and the noise evaluation information for a selected demodulated signal selected by the selector, supplying the pair of variable LPFs with the control signal which controls the bandwidths of the variable LPFs so as to optimize the reception level and the noise evaluation information for the selected demodulated signal.

BRIEF DESCRIPTION OF DRAWINGS

FIG. 7 is a diagram for explaining a reception area of the XM satellite radio broadcast.

EXPLANATIONS OF LETTERS OR NUMERALS

Figure 1:
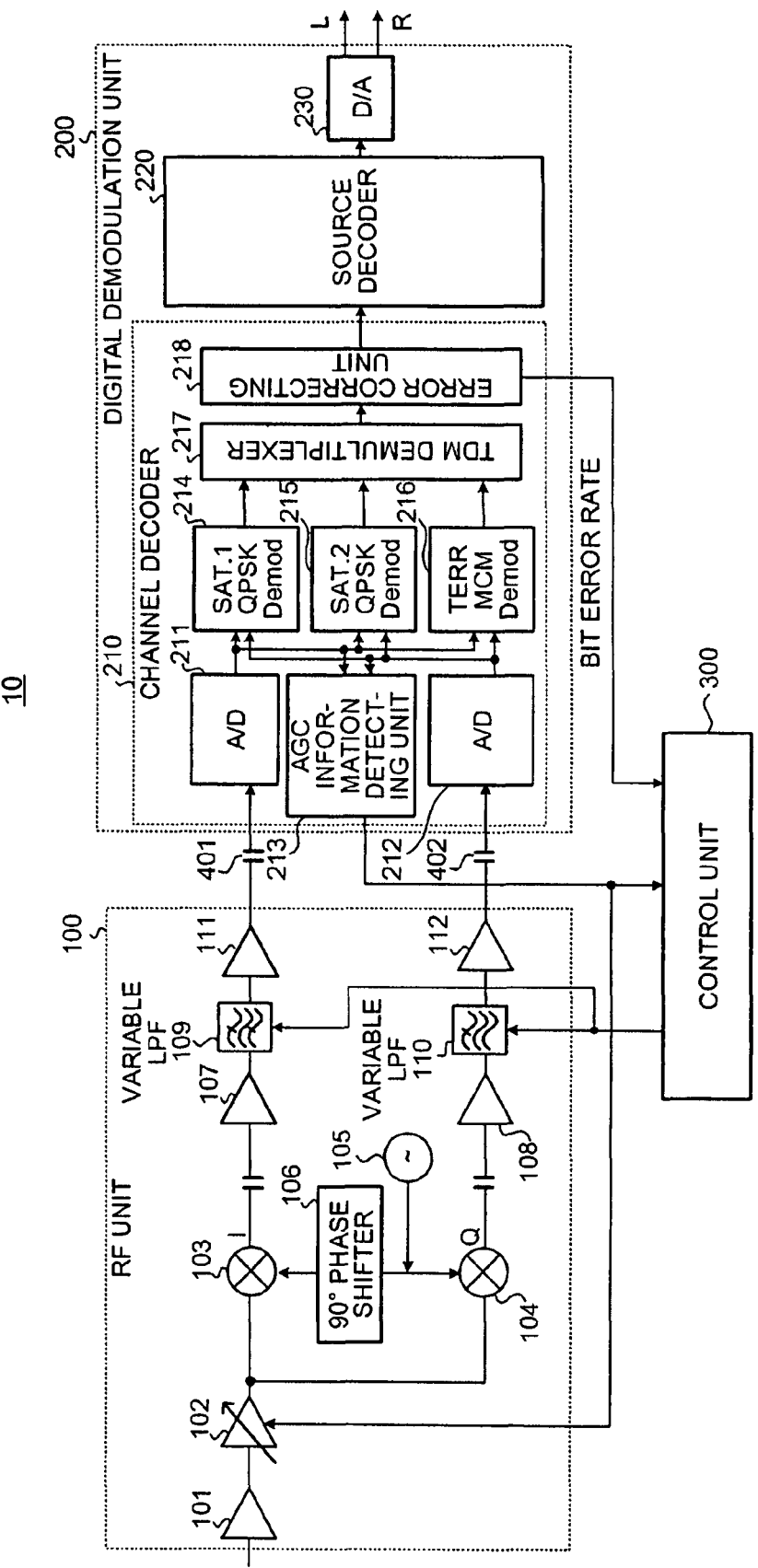
FIG. 1 is a diagram of a structure of a high-frequency receiver according to an embodiment of the present invention.

10 High-frequency receiver
100 RF unit
101 RF amplifier
102 AGC amplifier
103, 104 Mixers
105 Local oscillator
106 90° phase shifter
107, 108 Amplifiers
109, 110 Variable LPFs
111, 112 Amplifiers
200 Digital demodulation unit
210 Channel decoder
211, 212 A/D converters
213 AGC information detecting unit
214 QPSK demodulation unit for SAT1
215 QPSK demodulation unit for SAT2
216 MCM demodulation unit for TERR
217 TDM demultiplexer
218 Error correcting unit
220 Source decoder
230 D/A converter
300 Control unit

BEST MODE(S) FOR CARRYING OUT THE INVENTION

Exemplary embodiments of a high-frequency receiver and a method of reducing adjacent interference waves according to the present invention are explained in detail below with reference to the accompanying drawings. The present invention is not limited by the embodiments. All combinations of characteristics explained in the embodiments are not always necessary for the means for solving the problems according to the present invention. Components in the embodiments include components that those skilled in the art can easily anticipate or components substantially the same as the components.

FIG. 1 is a diagram of a structure of a high-frequency receiver 10 according to an embodiment of the present invention. The high-frequency receiver 10 shown in FIG. 1 indicates, in particular, a digital broadcast receiver that receives the XM satellite radio broadcast.

The high-frequency receiver 10 shown in FIG. 1 adopts a direct conversion system (also referred to as "zero IF system"). The high-frequency receiver 10 roughly includes an RF unit 100, a digital demodulation unit 200, and a control unit 300.

The RF block 100 includes an RF amplifier 101, an AGC amplifier 102, mixers 103 and 104, a local oscillator 105, a 90° phase shifter 106, amplifiers 107 and 108, variable low-pass filters 109 and 110, and amplifiers 111 and 112.

The RF amplifier 101 amplifies an RF signal input thereto and outputs the RF signal to the AGC amplifier 102. The AGC amplifier 102 adjusts a gain of the RF signal and outputs the RF signal to the mixers 103 and 104 according to the control by the control unit 300.

The local oscillator 105 generates a local oscillation signal having a frequency substantially equal to that of the RF signal and outputs the local oscillation signal to the mixer 104 and the 90° phase shifter 106. The 90° phase shifter 106 phase-shifts the local oscillation signal, which is input from the local oscillator 105, by 90° and outputs the local oscillation signal to the mixer 103. The mixers 103 and 104 mix the RF signal, which is input from the AGC amplifier 102, with the local oscillation signal and the local oscillation signal phase-shifted by 90°, respectively, and output 110 signals of a baseband component having a frequency of a difference between the frequency of the local oscillation signal and the frequency of the RF signal to the amplifiers 107 and 108 via capacitors, respectively.

The amplifiers 107 and 108 amplify the I/Q signals and output the I/Q signals to the variable LPFs 109 and 110, respectively. The variable LPFs 109 and 110 include coils, resistors, and capacitors. The variable LPFs 109 and 110 are capable of changing pass bands by selectively connecting a plurality of capacitors having capacitances different from one another to a signal line. The switching of the connection of the capacitors is performed according to a control signal of the control unit 300. The variable LPFs 109 and 110 limit pass bands of the I/Q signals input thereto and output the I/Q signals to the amplifiers 111 and 112. The amplifiers 111 and 112 amplify and output the I/Q signals input from the variable LPFs 109 and 110. The I/Q signals are input to the digital demodulation unit 200 via coupling capacitors 401 and 402.

The digital demodulation unit 200 includes a channel decoder 210, a source decoder 220, and a D/A converter 230.

The channel decoder 210 includes A/D converters 211 and 212, an AGC information detecting unit 213, a QPSK demodulation unit for SAT1 214, a QPSK demodulation unit for STA2 215, a MCM demodulation unit 216 for TERR, a TDM demultiplexer 217, and an error correcting unit 218.

The A/D converter 211 A/D-converts the I signal input thereto and outputs the I signal to the QPSK demodulation unit for SAT1 214, the QPSK demodulation unit for SAT2 215, the MCM demodulation unit for TERR 216, and the AGC information detecting unit 213. The A/D converter 212 A/D-converts the Q signal input thereto and outputs the Q signal to the QPSK demodulation unit for SAT1 214, the QPSK demodulation unit for SAT2 215, the MCM demodulation unit for TERR 216, and the AGC information detecting unit 213.

The QPSK demodulation unit for SAT1 214 QPSK-demodulates reception data of a satellite SAT1 from the I/Q signals input thereto and outputs the reception data to the TDM demultiplexer 217. The QPSK demodulation unit for SAT2 215 QPSK-demodulates reception data of a satellite SAT2 from the I/Q signals input thereto and outputs the reception data to the TDM demultiplexer 217. The MCM demodulation unit for TERR 216 MCM-demodulates reception data of a ground repeater TERR from the I/Q signals input thereto and outputs the reception data to the TDM demultiplexer 217.

The AGC information detecting unit 213 outputs AGC information indicating signal levels of the reception data input to the A/D converters 211 and 212 to the AGC amplifier 102 and the control unit 300.

The TDM demultiplexer 217 selects a reception data stream having a better reception quality out of the reception data streams input thereto (the reception data stream of the satellite wave SAT1, the reception data stream of the satellite wave SAT2, and the reception data stream of the ground wave TERR) and outputs the selected reception data stream to the error correcting unit 218. The error correcting unit 218 performs error correction for the reception data input thereto and outputs the error-corrected reception data to the source decoder 220. The error correcting unit 218 outputs a bit error rate or noise evaluation information of the reception data to the control unit 300.

The source decoder 220 decodes the compressed data input from the channel decoder 210 and outputs stereo signals L and R via the D/A converter 230.

The control unit 300 includes a microcomputer and a DSP. The control unit 300 also includes a CPU, a nonvolatile memory having stored therein control programs executed by the CPU, a volatile memory in which data is temporarily stored, input and output ports, an A/D converter, and a D/A converter.

On the basis of the AGC information indicating the signal level of the reception data input from the AGC information detecting unit 213 and the bit error rate input from the error correcting unit 218, the control unit 300 controls pass bands of the variable LPFs 109 and 110 to optimize the signal level and the error rate of the reception data selected and output by the TDM demultiplexer 217. Specifically, the control unit 300 outputs a control signal for switching the connection of the capacitors of the variable LPFs 109 and 110 to the variable LPFs 109 and 110 and controls the pass bands of the variable LPFs 109 and 110 to optimize the reception level and the bit error rate of the reception data selected by the TDM demultiplexer 217.

An overview of a reception operation of the high-frequency receiver 10 having the structure described above is explained. First, an RF signal is input to the RF unit 100 via an antenna. In the RF unit 100, after being amplified by the RF amplifier 101, the RF signal is gain-adjusted by the AGC amplifier 102 and input to the mixers 103 and 104. In the mixers 103 and 104, the RF signal is mixed with a local oscillation signal and a local oscillation signal phase-shifted by 90°, respectively. I/Q signals of a baseband component having a frequency of a difference between a frequency of the local oscillation signal and a frequency of the RF signal are generated and input to the amplifiers 107 and 108 via the capacitors, respectively. The I/Q signals input to the amplifiers 107 and 108 are amplified, respectively, and, after pass bands thereof are limited by the variable LPFs 109 and 110, input to the digital demodulation unit 200 via the coupling capacitors 401 and 402.

In the digital demodulation unit 200, after being A/D-converted into digital signals by the A/D converters 211 and 212, the I/Q signals are input to the QPSK demodulation unit for SAT1 214, the QPSK demodulation unit for SAT2 215 and the MCM demodulation unit for TERR 216. After being demodulated into reception date of the satellite wave SAT1, reception data of the satellite wave SAT2 and reception data of the ground wave TERR, the I/Q signals are input to the TDM demultiplexer 217. In the TDM demultiplexer 217, one of reception data having a better reception quality is selected out of the reception data input thereto (the reception data of the satellite SAT1, the reception data of the satellite wave SAT2 and the reception data of the ground wave TERR) and is output to the error correcting unit 218. After the reception data input to the error correcting unit 217 is subjected to error correction, the compressed data is decoded by the source decoder 220 and output as the stereo signals L and R via the D/A converter 230.

In this reception operation, a bandwidth of the variable LPFs 109 and 110 is controlled by the control unit 300. A method of reducing adjacent interference waves for the high-frequency receiver 10 of FIG. 1 is explained with reference to FIGS. 2 to 4. In the following description, a method of reducing adjacent interference waves is described for an exemplary case in which the high-frequency receiver 10 selects and receives reception data of ground waves in an area such as E2 and E3 where the ground wave TERR can be sufficiently received.

Figure 2:
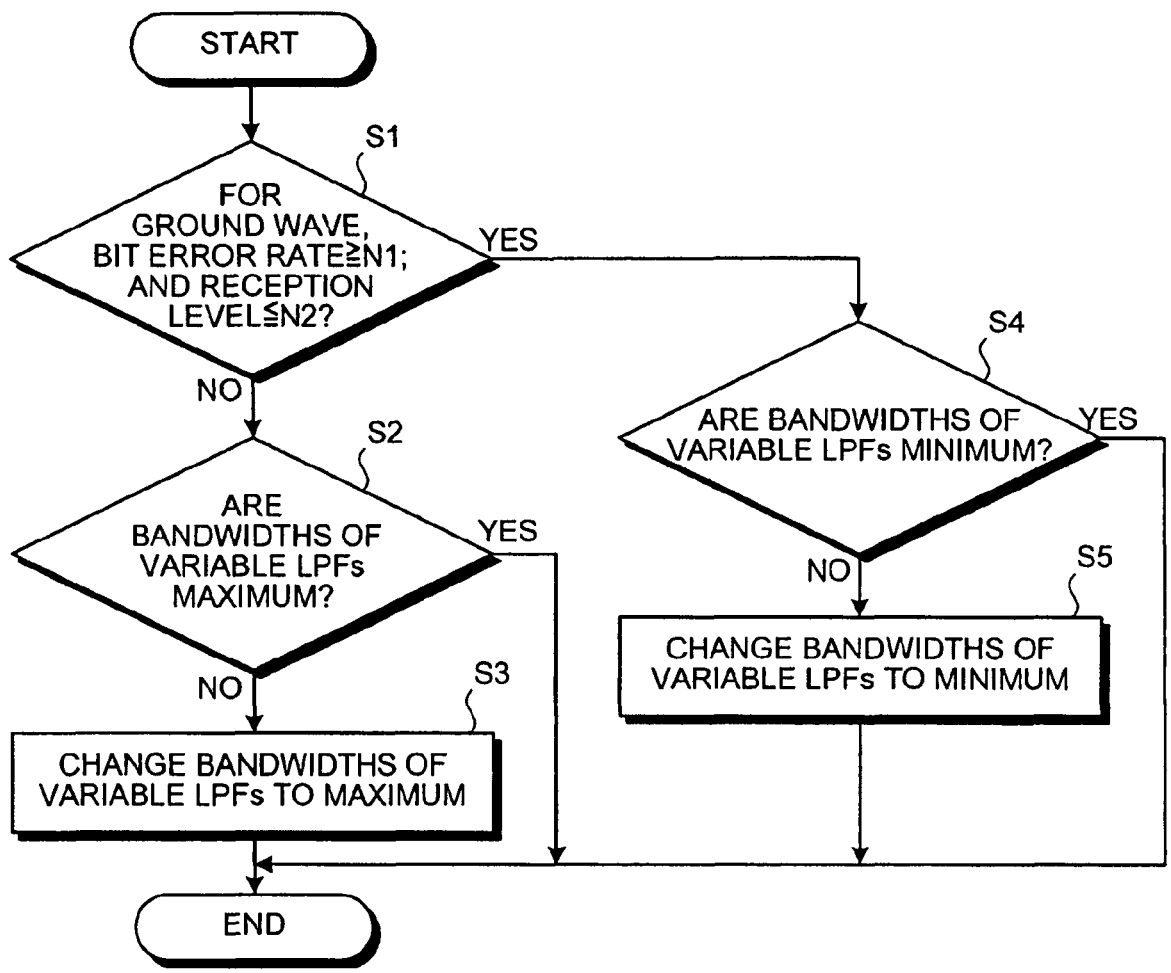
FIG. 2 is a flowchart for explaining a method of reducing adjacent interference waves for the high-frequency receiver of FIG. 1.

FIG. 2 is a flowchart for explaining the method of reducing adjacent interference waves for the high-frequency receiver 10 of FIG. 1 and for explaining the control of a bandwidth of the variable LPFs 109 and 110 by the control unit 300.

In FIG. 2, first, the control unit 300 judges whether a bit error rate of the ground wave TERR is equal to or larger than a first threshold N1 and a reception level of the ground wave TERR is equal to or higher than a second threshold N2 (step S1). When the bit error rate of the ground wave TERR is equal to or larger than the first threshold N1 and the reception level of the ground wave TERR is equal to or higher than the second threshold N2 (in case of YES in step S1), i.e., when the bit error rate of the ground wave TERR is bad or undesirable regardless of the fact that the reception level of the ground wave TERR is high, the control unit 300 can judge that reception interference due to adjacent interference waves has occurred. On the other hand, when the bit error rate of the ground wave TERR is not equal to or smaller than the first threshold N1 and the reception level of the ground wave TERR is not equal to or higher than the second threshold N2 (in case of NO in step S1), the control unit 300 can judge that there is no influence due to adjacent interference wave.

When the bit error rate of the ground wave TERR is equal to or smaller than the first threshold N1 and the reception level of the ground wave TERR is equal to or higher than the second threshold N2 ("Yes" at step S1), the control unit 300 judges whether a present bandwidth of the variable LPFs 109 and 110 is the minimum (a lower limit) (step S4). When the present bandwidths of the variable LPFs 109 and 110 are not the minimum (the lower limit) bandwidth ("No" at step S4), the control unit 300 changes the bandwidths of the variable LPFs 109 and 110 to the minimum (the lower limit) (step S5) to change a band characteristics of the variable LPFs 109 and 110 to a band characteristic for selecting only the ground wave TERR.

On the other hand, when the bit error rate of the ground wave TERR is not equal to or smaller than the first threshold N1 and the reception level of the ground wave TERR is not equal to or higher than the second threshold N2 ("No" at step S1), the control unit 300 judges whether the present bandwidth of the variable LPFs 109 and 110 is the maximum (an upper limit) (step S2). When the present bandwidth of the variable LPFs 109 and 110 is not the maximum (the upper limit) bandwidth ("No" at step S2), the control unit 300 changes the bandwidths of the variable LPFs 109 and 110 to the maximum (the upper limit) (step S3).

Figure 3:
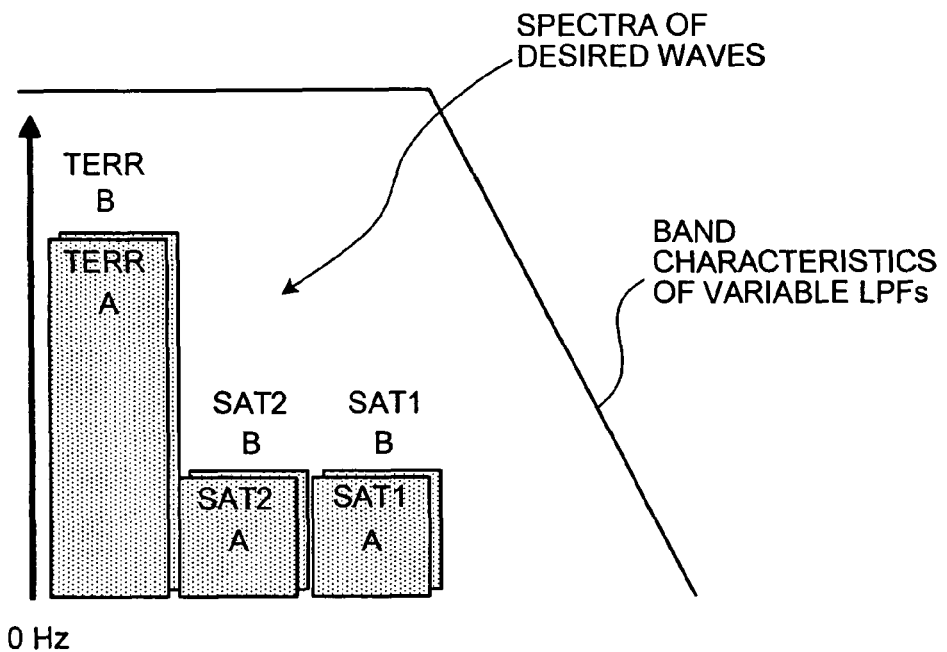
FIG. 3 is a diagram for explaining a bandwidth of variable LPFs set to the maximum (an upper limit).
Figure 4:
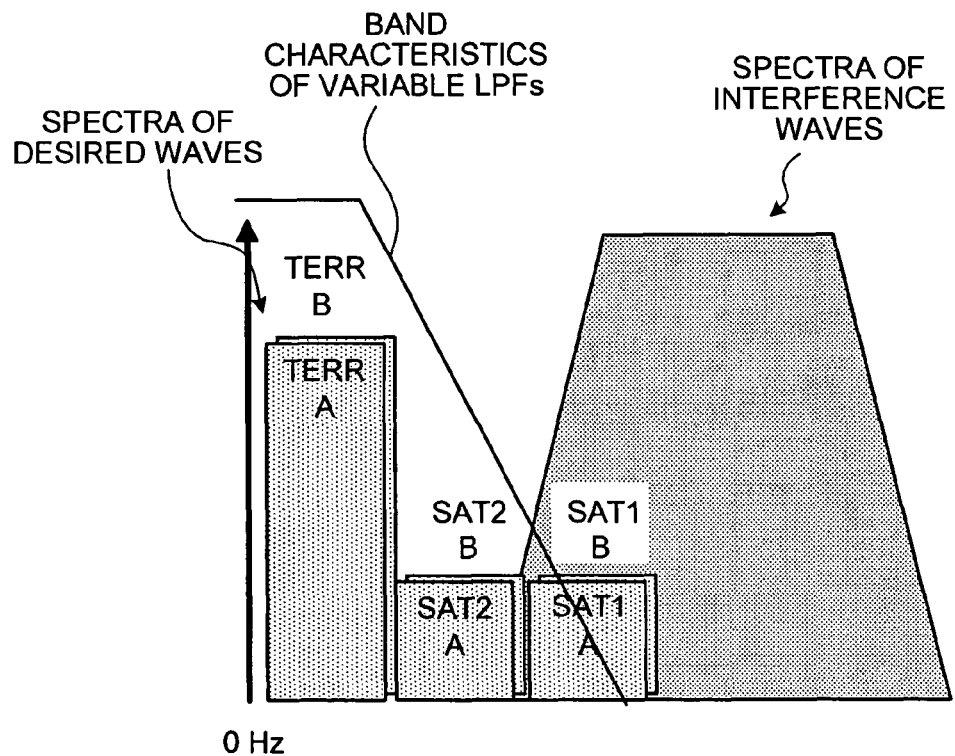
FIG. 4 is a diagram for explaining a bandwidth of the variable LPFs set to the minimum (a lower limit).
Figure 5:
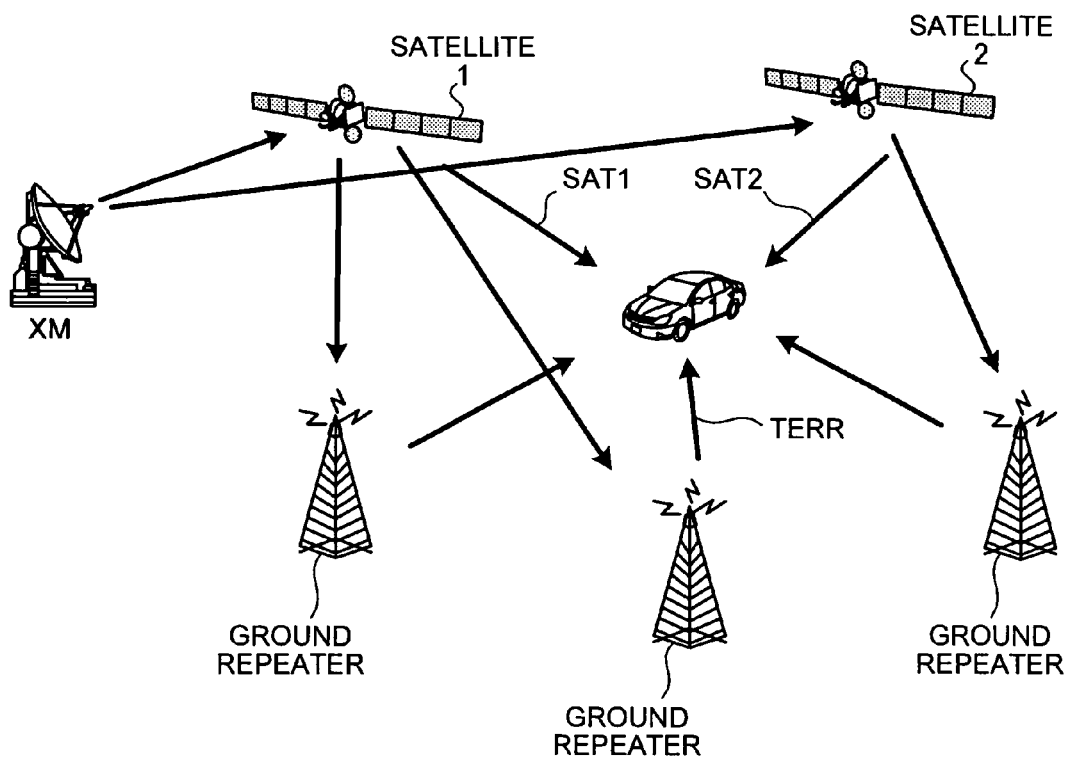
FIG. 5 is a diagram for explaining an XM satellite radio broadcast system.
Figure 6:
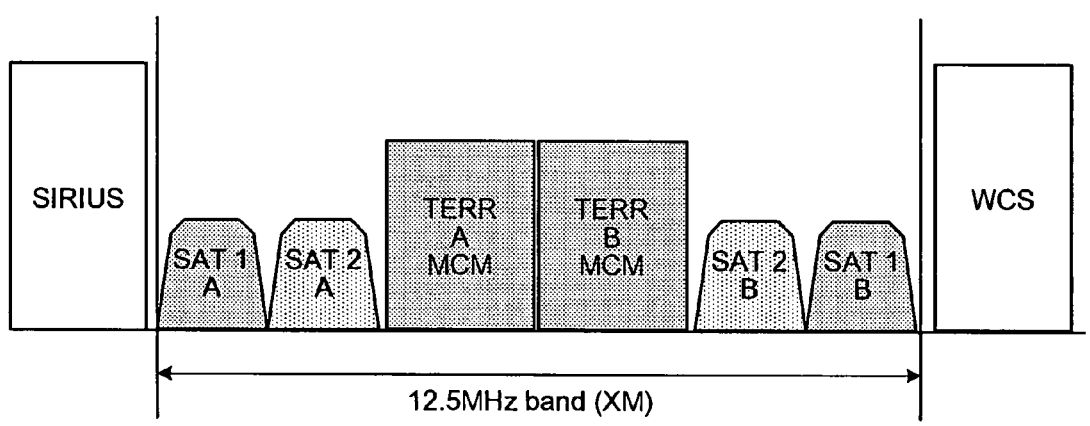
FIG. 6 is a diagram of a frequency band of the XM satellite radio broadcast.

FIG. 3 is a diagram for explaining a bandwidth of the variable LPFs 109 and 110 set to the maximum (the upper limit). In particular, FIG. 3 is a diagram of signal spectra and the bandwidth characteristics of the variable LPFs 109 and 110 at the time when there is no adjacent interference wave. FIG. 4 is a diagram for explaining the bandwidths of the variable LPFs 109 and 110 set to the minimum (the lower limit) and is a diagram of signal spectra and the bandwidth characteristics of the variable LPFs 109 and 110 at the time when there are adjacent interference waves.

As shown in FIG. 3, when there is no adjacent interference wave, the bandwidths of the variable LPFs 109 and 110 are set to the upper limit (the maximum) and a reception level of the ground wave TERR is set to the maximum. On the other hand, as shown in FIG. 4, when there are adjacent interference waves, the bandwidths of the variable LPFs 109 and 110 are set to the minimum (the lower limit). Therefore, signals of the satellite waves SAT1 and SAT2 are attenuated. However, since this processing is performed when a reception state of the ground wave ERR is better than that of the satellite waves SAT1 and SAT2 and the ground wave TERR is selected and received as described above, no problem occurs even if the signals of the satellite waves SAT1 and SAT2 are attenuated. In other words, in the XM satellite radio broadcasting, since the same contents are output by the satellite waves SAT1 and SAT2 and the ground wave TERR, it is sufficient that one of the satellite waves SAT1 and SAT2 and the ground waves TERR can be received. Therefore, no problem occurs even if the signals of the satellite waves SAT1 and SAT2 are attenuated.

In this way, when the ground wave TERR is prevented by strong adjacent interference waves in the area in which the ground wave TERR can be sufficiently received, the band characteristics of the variable LPFs 109 and 110 are changed to suppress the levels of the adjacent interference waves. Therefore, it is possible to receive the ground wave TERR with a high sound quality.

As explained above, according to this embodiment, when a bit error rate of reception data of a broadcast wave intended to be received (e.g., the ground wave TERR) is equal to or smaller than the first threshold N1 and a reception level thereof is equal to or higher than the second threshold N2, the band characteristics of the variable LPFs 109 and 110 are changed to the band characteristic for selecting only the broadcast wave intended to be received. Therefore, it is possible to reduce a reception failure due to adjacent interference waves without deteriorating reception performance such as a sound quality.

According to this embodiment, when the bit error rate of the reception data of the broadcast wave intended to be received (e.g., the ground wave TERR) is not equal to or smaller than the first threshold N1 and the reception level thereof is not equal to or higher than the second threshold N2, the band characteristics of the variable LPFs 109 and 110 are set to be as wide as possible. Therefore, it is possible to set the reception level of the reception data of the broadcast wave intended to be received to the maximum.

In this embodiment, the XM satellite radio broadcast is received. However, the present invention is not limited to this. It is possible to widely apply the present invention to systems that broadcast the same contents with a plurality of broadcast waves in different frequency bands. In this embodiment, the ground wave is selected. However, it is also possible to apply the present invention when a satellite wave is selected. In this embodiment, the bit error rate is used as the noise evaluation information. However, the present invention is not limited to this. Other information can be used as long as noise of reception data can be evaluated using the information. In this embodiment, the direct conversion system is used as an example of frequency conversion. However, the present invention is not limited to this. A system for converting a signal into an IF signal can be used.

In this embodiment, the variable widths of the variable LPFs 109 and 110 are changed at the two stages. However, the variable widths can be changed at multiple stages. In this embodiment, the variable LPFs 109 and 110 include the resistors and the capacitors and change a pass band by selectively connecting the capacitors having capacitances different from one another to the signal line. However, the structure can be any structure as long as the variable LPFs 109 and 110 can change the pass band.

INDUSTRIAL APPLICABILITY

As described above, it is possible to widely apply the high-frequency receiver and the method of reducing adjacent interference waves according to the invention to apparatuses that select a signal of a desired channel from high-frequency signals.

The invention claimed is:

1. A high-frequency receiver for use in a location where an identical set of broadcast channels can be received with different broadcast waves which are broadcast or relayed in frequency bands different from one another, comprising:
    a separating unit that separates received broadcast channel signals into I signals and Q signals;
    a pair of variable LPFs which only pass frequency components of the I signals and Q signals which components are within respective bandwidths thereof, each variable LPF being configured to be capable of changing the bandwidth thereof in response to a control signal given externally;
    a demodulation unit, provided for each of said different broadcast waves, for demodulating the I and Q signals derived from the broadcast wave into a demodulated signal;
    a selector for selecting one of the demodulated signals which has a better reception quality;
    a reception-level detector that detects a reception level of each of the received broadcast waves;
    a noise-evaluation-information detector that detects noise evaluation information of each of the received broadcast waves; and
    a control unit, operative based on the reception level and the noise evaluation information for a selected demodulated signal selected by the selector, for supplying the pair of variable LPFs with said control signal which controls the bandwidths of the variable LPFs so as to optimize the reception level and the noise evaluation information for the selected demodulated signal.

2. The high-frequency receiver according to claim 1, wherein the control unit comprises:
    a decision unit which decides whether there is nonnegligible influence of adjacent interference waves on the basis of the reception level and the noise evaluation information for the selected demodulated signal; and
    a first control unit, responsive to a decision that there is nonnegligible influence of adjacent interference waves, for controlling said control signal to narrow the bandwidths of the LPFs so as to cause the frequency bands of the adjacent interference waves to go out of the bandwidths of the LPFs.

3. The high-frequency receiver according to claim 2, wherein the control unit comprises:
    a second control unit, responsive to a negative result of a decision by the decision unit, for controlling said control signal to make the bandwidths of the LPFs maximum.

4. The high-frequency receiver according to claim 2, wherein the decision unit comprises a unit which determines that there is nonnegligible influence of adjacent interference waves if the reception level for the selected demodulated signal is equal to or larger than a predetermined level threshold value and if a value of the noise evaluation information for the selected demodulated signal is equal to or larger than a predetermined noise threshold value.

5. The high-frequency receiver according to claim 1, wherein the control unit comprises:
   a decision unit which decides whether there is nonnegligible influence of adjacent interference waves on the basis of the reception level and the noise evaluation information for the selected demodulated signal; and
   a second control unit, responsive to a negative result of a decision by the decision unit, for controlling said control signal to make the bandwidths of the LPFs maximum.

6. The high-frequency receiver according to claim 5, wherein the decision unit comprises a unit which determines that there is nonnegligible influence of adjacent interference waves if the reception level for the selected demodulated signal is equal to or larger than a predetermined level threshold value and if a value of the noise evaluation information for the selected demodulated signal is equal to or larger than a predetermined noise threshold value.

7. The high-frequency receiver according to claim 1, wherein the noise evaluation information is a bit error rate.

8. The high-frequency receiver according to claim 1, wherein the different broadcast waves include at least one satellite wave from at least one satellite and a ground wave from a ground repeater.

9. A method of alleviating an influence of adjacent interference waves in a high-frequency receiver used in a location where an identical set of broadcast channels can be received with different broadcast waves which are broadcast or relayed in frequency bands different from one another, comprising:
   separating received broadcast channel signals into I signals and Q signals;
   passing the I signals and Q signals to a pair of variable LPFs which pass only frequency components of the I signals and Q signals which components are within respective bandwidths thereof, each variable LPF being configured to be capable of changing the bandwidth thereof in response to a control signal given externally;
   for each of said different broadcast waves, demodulating the I and Q signals derived from the broadcast wave into a demodulated signal;
   selecting one of the demodulated signals which has a better reception quality;
   detecting a reception level of each of the received broadcast waves;
   detecting noise evaluation information of each of the received broadcast waves; and
   based on the reception level and the noise evaluation information for a selected demodulated signal selected by the selector, supplying the pair of variable LPFs with said control signal which controls the bandwidths of the variable LPFs so as to optimize the reception level and the noise evaluation information for the selected demodulated signal.

10. The method according to claim 9, wherein supplying the pair of variable LPFs with said control signal comprises:
    deciding whether there is nonnegligible influence of adjacent interference waves on the basis of the reception level and the noise evaluation information for the selected demodulated signal; and
    in response to a decision that there is nonnegligible influence of adjacent interference waves, controlling said control signal to narrow the bandwidths of the LPFs so as to cause the frequency bands of the adjacent interference waves to go out of the bandwidths of the LPFs.

11. The method according to claim 10, wherein supplying the pair of variable LPFs with said control signal comprises:
    in response to a negative result of a decision by the decision unit, controlling said control signal to make the bandwidths of the LPFs maximum.

12. The method according to claim 10, wherein deciding whether there is nonnegligible influence of adjacent interference waves comprises deciding so if the reception level for the selected demodulated signal is equal to or larger than a predetermined level threshold value and if a value of the noise evaluation information for the selected demodulated signal is equal to or larger than a predetermined noise threshold value.

13. The method according to claim 9, wherein supplying the pair of variable LPFs with said control signal comprises:
    deciding whether there is nonnegligible influence of adjacent interference waves on the basis of the reception level and the noise evaluation information for the selected demodulated signal; and
    in response to a negative result of a decision by the decision unit, controlling said control signal to make the bandwidths of the LPFs maximum.

14. The method according to claim 13, wherein deciding whether there is nonnegligible influence of adjacent interference waves comprises deciding so if the reception level for the selected demodulated signal is equal to or larger than a predetermined level threshold value and if a value of the noise evaluation information for the selected demodulated signal is equal to or larger than a predetermined noise threshold value.

15. The method according to claim 9, wherein the noise evaluation information is a bit error rate.

16. The method according to claim 9, wherein the different broadcast waves include at least one satellite wave from at least one satellite and a ground wave from a ground repeater.

* * * * *